United States Patent [19]
Knaus

[11] 3,831,665
[45] Aug. 27, 1974

[54] EXTRUDER BARREL TEMPERATURE CONTROL

[75] Inventor: Dennis A. Knaus, Centerville, Mass.

[73] Assignee: Packaging Industries, Inc., Hyannis, Mass.

[22] Filed: Jan. 19, 1972

[21] Appl. No.: 218,873

[52] U.S. Cl. ............................................. 165/87
[51] Int. Cl. ............................................. F28f 5/06
[58] Field of Search ...................... 165/1, 86, 87, 89

[56] References Cited
UNITED STATES PATENTS

| | | | |
|---|---|---|---|
| 1,392,626 | 10/1921 | Cox | 165/89 |
| 1,516,968 | 11/1924 | Johnson | 165/87 |
| 1,781,378 | 11/1930 | Feeney | 165/89 |
| 1,902,295 | 3/1933 | Shook | 165/87 |
| 3,545,533 | 10/1970 | Matsuuka | 165/86 |

*Primary Examiner*—Charles Sukalo
*Attorney, Agent, or Firm*—Brumbaugh, Graves, Donohue & Raymond

[57] ABSTRACT

At least a part of the barrel of an extruder in which plastic is heated, mixed, pressurized, and forced through a die is formed with a plurality of longitudinal passages all around the bore, close to the bore, and extending substantially parallel to the bore axis. Transverse passages respectively communicate with the longitudinal passages adjacent to opposite ends thereof, and plugs are provided for plugging the ends of the longitudinal passages. By means of these passages a heat-exchange fluid is circulated through the barrel in good heat-exchange relationship with the plastic and at a proper temperature to bring the plastic to a desired temperature. Independent control of the flow of the heat-exchange fluid can be established in different zones.

6 Claims, 2 Drawing Figures

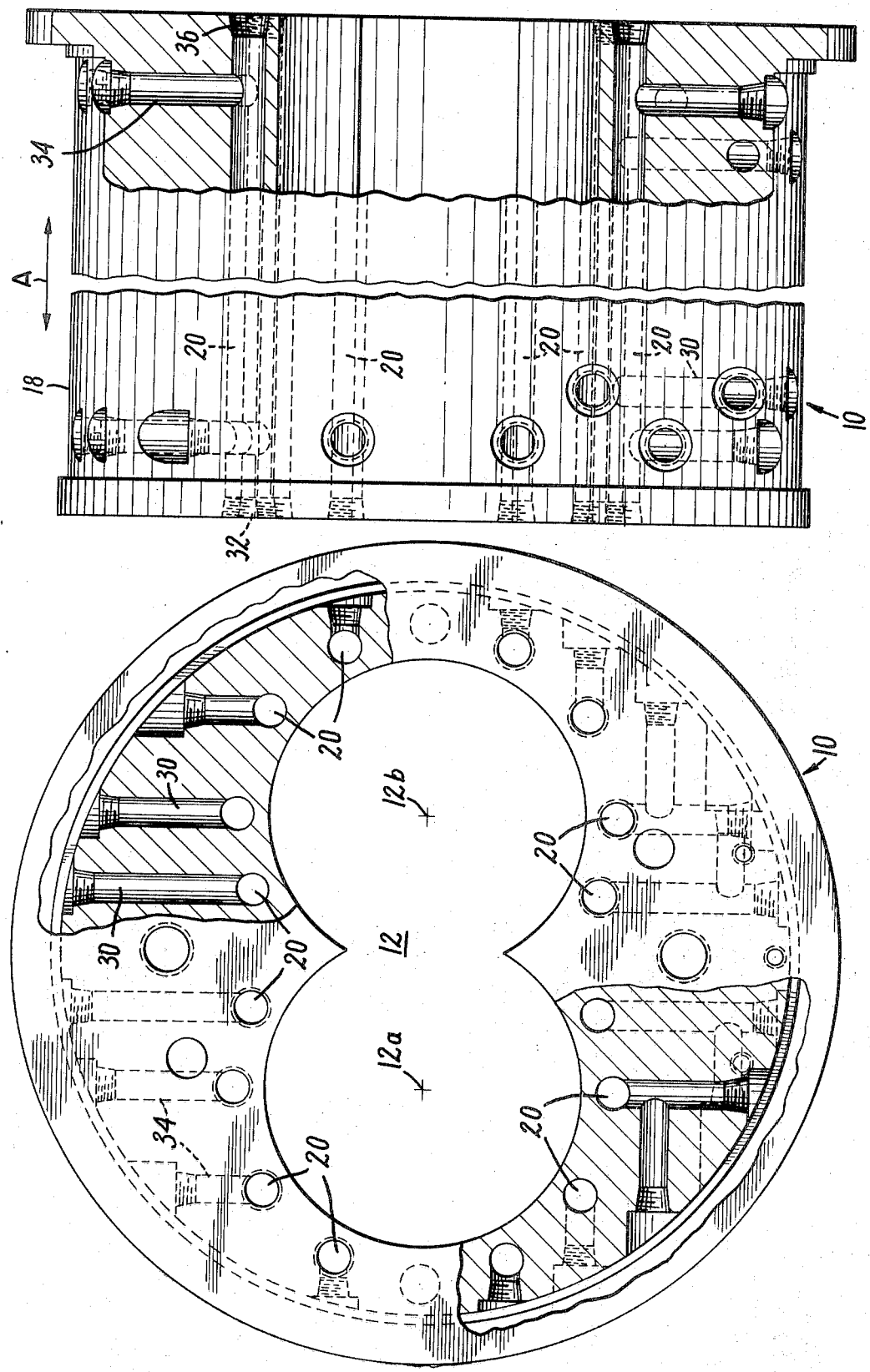

EXTRUDER BARREL TEMPERATURE CONTROL

BACKGROUND OF THE INVENTION

This invention relates to plastics manufacture, and, in particular, to novel and highly-effective methods and apparatus facilitating increased output of machinery designed to extrude plastic as one of the manufacturing steps.

Extrusion is an essential process in most plastics manufacture, and measures that facilitate extrusion benefit the manufacturing process. The plastic is typically heated in the extruder barrel before it is mixed and pumped through the die. The temperatures at which these operations are optimally performed may differ, and it is therefore necessary to vary the temperature of the plastic in the barrel.

Such temperature conditioning is usually effected by one or more of the following expedients: a copper tube laid in a spiral groove around the exterior of the barrel; passages for a heat-exchange fluid formed in "wrap-around"cast-aluminum heaters; air forced by blowers through ducts surrounding the barrel; mica-type cylindrical band heaters wrapped around the barrel; and cartridge heaters placed in holes drilled in the barrel.

All of these conventional expedients are characterized by poor heat transfer efficiency because of lack of direct molecular contact of the heat-exchange fluid and/or of the temperature-conditioning devices with the barrel and because of the considerable distance between the heat-exchange fluid and/or the temperature-conditioning devices on the one hand and the plastic on the other. The poor heat transfer efficiency in turn limits output since additional time is required to achieve the requisite temperature control.

SUMMARY OF THE INVENTION

An object of the invention is to remedy the deficiencies of the prior art outlined above and, in particular, to provide a method and apparatus facilitating improved heat-exchange efficiency and increased output.

The foregoing and other objects are attained in accordance with the invention by the provision of apparatus for processing plastic comprising a barrel having a longitudinal axis and a thick metal wall formed with a bore parallel to the axis wherein a hot plastic is mixed and propelled. The barrel wall is formed with a plurality of longitudinal passages for circulating therethrough a heat-exchange fluid (such as water, oil, or a mixture of liquids; or air or another gas or mixture of gases). The longitudinal passages are positioned all around and closely spaced apart from the bore and are substantially parallel to the barrel axis. This permits individual control of the flow of the heat-exchange fluid through respective individual longitudinal passages.

The barrel is further formed with transverse passages respectively communicating with the longitudinal passages adjacent to opposite ends thereof. Plug means are provided for selectively plugging the longitudinal passages at their ends, so that the heat-exchanging fluid can be circulated through one or more barrel sections individually or collectively in a predetermined flow pattern.

BRIEF DESCRIPTION OF THE DRAWING

An understanding of other aspects of the invention can be gained from a consideration of the following detailed description of the preferred embodiments thereof, in conjunction with the appended figures of the drawing, wherein:

FIG. 1 is an end elevational view, partly broken away, of a barrel section constructed in accordance with the invention; and FIG. 2 is a side elevational view, partly broken away, of the apparatus of FIG. 1.

DESCRIPTION OF THE PREFERRED EMBODIMENTS

FIGS. 1 and 2 show in detail a typical extruder barrel section 10 constructed in accordance with the invention. The barrel section 10 is made of a strong, heat-conductive metal such as steel and has a longitudinal axis parallel to the double-headed arrow A in FIG. 2. The barrel 10 is formed with a bore 12, which preferably has a cylindrical shape or a shape resembling two or more cylindrical portions, as shown. Within the bore, one or more screws (not shown) are mounted for mixing a plastic and propelling it through the bore to the die. In the embodiment of the invention illustrated, twin screws are employed, the screws being respectively centered at 12a and 12b and having threads formed to mesh at the center of the bore 12 and to scour the walls of the bore so that the plastic is efficiently propelled. The structure of the barrel as detailed thus far in the description of the preferred embodiments is conventional and available from commercial sources.

In order to process the plastic, it must be heated. The plastic is brought to a temperature at which it can be properly mixed. In accordance with conventional practice, therefore, various expedients are adopted for controlling the temperature of the plastic in the barrel 10. For example, mica-type cylindrical band heaters wrapped around the barrel may be employed, or cartridge heaters may be placed in holes drilled in the barrel. Unless precautions are taken, an air boundary results between the temperature-conditioning devices and the barrel. This results in inefficient heat exchange because of the insulating properties of air. It is also possible to form a spiral groove in the exterior 18 of the barrel and lay a copper tube in the spiral groove for the purpose of circulating a heat-exchange fluid around the outside of the barrel. This expedient is inefficient, since the heat-exchange fluid makes direct contact with the copper tube but not with the metal of which the barrel is formed and since the fluid is moreover at a considerable distance from the plastic to be conditioned. Another expedient that is used is the provision of wrap-around cast-aluminum heaters with resistance type heating elements and integral passages for a heat-exchange fluid. Still another expedient that has been tried is to blow air through air ducts which surround the barrel 10. These latter expedients are also inefficient because of lack of direct molecular contact of the heat-exchange fluid with the barrel 10 and because of the substantial distance between the heat-exchange fluid and the plastic within the bore 12 of the barrel 10. It has also been proposed to drill transverse passages through the barrel, but this expedient as practiced does not provide proper or efficient control of plastic temperature in different zones.

In accordance with the present invention, the barrel 10 is formed with a plurality of longitudinal passages such as the ones indicated at 20 through which a heat-exchange fluid is circulated. The heat-exchange fluid, water for example, makes direct molecular contact with the metal of the barrel 10 for maximum heat-exchange efficiency. Moreover, the longitudinal passages 20 are positioned around and closely spaced apart from the bore 12, are substantially parallel to the barrel axis A, are spaced apart at equal intervals, and are connected to fluid circulation means in such a manner as to permit individual control of the flow through respective ones of the longitudinal passages.

Any suitable fluid circulation means can be employed in accordance with the invention, and thus no particular fluid circulation means is illustrated. For example, it can include a pump and, if a separate temperature control capability is to be provided for more than one barrel section, a number of branch lines in parallel. A heat exchanger is provided for adjusting the temperature of the heat-transfer fluid and, if separate branch lines are provided for different barrel sections to be controlled, a separate heat exchanger can be provided in each branch line, so that the temperature of the liquid, gas, or other fluid in each branch line can be separately controlled. Separate circulation loops from each of the branch lines can be provided to supply the barrel sections independently with heat-exchange fluid. Valves can be associated with each of the circulation loops to control the impedance of each loop (or to bypass a loop) and hence to control the rate of flow of heat-exchange fluid therethrough. As many parallel lines can be provided as may be necessary so that, for example, each barrel section can be separately supplied with heat-exchange fluid at a flow rate and at a temperature that can be controlled individually.

Each circulation loop can include supply and return lines, a supply distribution manifold connected to the supply line, and a collection manifold connected to the return line. The manifolds can be of similar construction. Each can be substantially ring-shaped and extend around one of the barrel sections. The supply manifolds supply coolant to a set of transverse passages 30, which are connected to the longitudinal passages 20 at the upstream ends thereof. Pipe plugs 32 plug the upstream ends of the longitudinal passages 20. The downstream ends of the longitudinal passages 20 are respectively connected to another set of transverse passages 34 for permitting the heat-exchange fluid to flow to the collection manifold. Plugs 36 plug the downstream ends of the longitudinal passages 20.

It is within the scope of the invention to establish other flow patterns than the one described above. For example, flow can be through one of the transverse passages 30 to its associated longitudinal passages 20, through that passage 20 to its associated transverse passage 34, through its associated longitudinal passage 20 (in a direction opposite or upstream with respect to the direction of fluid flow in the longitudinal passage indicated above), and through the associated transverse passage 30. This pattern can be repeated all around the bore 20. In this case, of course, manifolds are not needed, and short U-sections connect successive pairs of transverse sections 30 and successive pairs of transverse sections 34. Clearly, many flow patterns can be established in accordance with the invention, including series flow, parallel flow, and various "hybrid" flows.

In order to keep the impedance to the flow of heat-exchange fluid low, the longitudinal passages 20 preferably have a diameter which is determined by the characteristics of the heat-exchange fluid being utilized and the heat transfer rate required. In a typical case, the heat-exchanger fluid may be water and the passages 20 may have a diameter of about 3/8ths of an inch. For good heat-exchange efficiency, they are spaced apart from the bore 12 a distance less than one diameter and preferably substantially equal to half the diameter or one radius of the longitudinal passages. Where each of two cylindrical portions of the bore 12 has a diameter of about 150 mm, about 12 to 20 longitudinal passages are formed in the barrel 10.

Thus there is provided in accordance with the invention a novel and highly-effective method and apparatus facilitating increased output of machinery designed to extrude plastic. Many modifications of the representative embodiments disclosed herein will readily occur to those skilled in the art. For example, the size and spacing of the longitudinal passages may be adjusted as necessary to provide efficient heat transfer and to ensure that the impedance to the flow of heat transfer fluid is not excessive. Also, a reasonable departure from a strict parallel relation between the longitudinal passages 20 and the bore axis is contemplated. Accordingly, the invention is to be construed as including all of the embodiments thereof within the scope of the appended claims.

I claim:

1. Apparatus for processing plastic comprising a barrel having a longitudinal axis and a metal wall formed with a bore parallel to said axis wherein a hot plastic is mixed and propelled, the barrel further having at one end an outlet with which the bore communicates and toward which the hot plastic is propelled through the bore, the metal wall of the barrel being formed with a plurality of longitudinal narrow drilled passages for circulating a heat exchange fluid therethrough, said longitudinal passages being positioned all around and closely spaced apart from said bore a distance less than the diameter of said longitudinal narrow passages and being substantially parallel to said barrel axis.

2. Apparatus according to claim 1 wherein said longitudinal passages are spaced apart at equal intervals around said bore.

3. Apparatus according to claim 1 wherein the diameter of said longitudinal passages is at least about 3/8ths of an inch and said fluid is water, whereby adequate heat transfer is obtained without appreciable impedance to the flow of said fluid through said longitudinal passages.

4. Apparatus according to claim 1 wherein the diameter of said longitudinal passages is substantially 3/8ths of an inch and said longitudinal passages are spaced apart from said bore a distance not substantially in excess of half of the diameter of said longitudinal passages, whereby the efficiency of heat exchange between said fluid and the plastic in said bore is promoted.

5. Apparatus according to claim 1 wherein said metal wall is further formed with two sets of transverse passages respectively communicating with said longitudinal passages adjacent to opposite ends thereof, further comprising plug means for plugging the ends of said longitudinal passages, whereby said fluid flows in a desired sequence through said transverse passages and said longitudinal passages.

6. Apparatus according to claim 5, wherein adjacent ends of different longitudinal passages each communicate with a different one of the transverse passages and wherein each transverse passage extends from an end of a longitudinal passage to the exterior of the barrel.

* * * * *